US010196531B2

(12) United States Patent
Jackson et al.

(10) Patent No.: US 10,196,531 B2
(45) Date of Patent: Feb. 5, 2019

(54) PIGMENTED INKJET INK COMPRISING DISPERSED POLYURETHANE AND OLEFIN IONIC COPOLYMER

(71) Applicant: E. I. DU PONT DE NEMOURS AND COMPANY, Wilmington, DE (US)

(72) Inventors: Christian Jackson, Wilmington, DE (US); C. Chad Roberts, Hockessin, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 112 days.

(21) Appl. No.: 15/108,888

(22) PCT Filed: Dec. 15, 2014

(86) PCT No.: PCT/US2014/070348
§ 371 (c)(1),
(2) Date: Jun. 29, 2016

(87) PCT Pub. No.: WO2015/102868
PCT Pub. Date: Jul. 9, 2015

(65) Prior Publication Data
US 2016/0333206 A1 Nov. 17, 2016

Related U.S. Application Data

(60) Provisional application No. 61/921,714, filed on Dec. 30, 2013.

(51) Int. Cl.
C09D 11/02 (2014.01)
C09D 11/106 (2014.01)
C09D 11/322 (2014.01)
C09D 11/102 (2014.01)
C09D 11/033 (2014.01)
C09D 11/107 (2014.01)

(52) U.S. Cl.
CPC .......... C09D 11/102 (2013.01); C09D 11/033 (2013.01); C09D 11/106 (2013.01); C09D 11/107 (2013.01); C09D 11/322 (2013.01)

(58) Field of Classification Search
CPC ... C09D 11/102; C09D 11/106; C09D 11/107; C09D 11/322; C09D 11/033
USPC ....................................................... 524/378
See application file for complete search history.

(56) References Cited

U.S. PATENT DOCUMENTS

| 4,597,794 | A | 7/1986 | Ohta et al. |
| 5,085,698 | A | 2/1992 | Ma et al. |
| 5,231,131 | A | 7/1993 | Chu et al. |
| 5,554,739 | A | 9/1996 | Belmont |
| 6,262,152 | B1 | 7/2001 | Fryd et al. |
| 6,306,994 | B1 | 10/2001 | Donald et al. |
| 6,433,117 | B1 | 8/2002 | Ma et al. |
| 6,852,156 | B2 * | 2/2005 | Yeh ................ C09B 67/0001 106/31.6 |
| 2003/0184629 | A1 | 10/2003 | Valentini et al. |
| 2005/0182154 | A1 | 8/2005 | Berge et al. |
| 2008/0269374 | A1 | 10/2008 | Ganapathiappan |
| 2010/0319573 | A1 * | 12/2010 | Carlini ................ C09B 29/106 106/18.32 |
| 2012/0249663 | A1 * | 10/2012 | Okumura ............ C09D 11/102 347/20 |
| 2013/0137816 | A1 * | 5/2013 | Berge ................ C09D 11/326 524/591 |
| 2013/0300805 | A1 * | 11/2013 | Hakamada ........... C09D 11/324 347/56 |
| 2014/0160212 | A1 * | 6/2014 | Chevli ................ C09D 11/30 347/100 |

FOREIGN PATENT DOCUMENTS

| CN | 103965685 A | 8/2014 |
| EP | 0556649 A1 | 8/1993 |
| EP | 2662421 A1 | 11/2013 |
| JP | 03161799 A * | 7/1991 |
| JP | 03161799 A * | 7/1991 |
| JP | 05-271599 A | 10/1993 |
| JP | 08231909 A | 9/1996 |
| JP | 08239605 A | 9/1996 |
| JP | 09-291242 A | 11/1997 |
| JP | 11001563 A | 1/1999 |
| JP | 2004-285304 | 10/2004 |
| JP | 2005-515289 | 5/2005 |
| JP | 3161799 | 8/2010 |
| JP | 2012-214713 | 11/2012 |
| WO | 2011/093486 A1 | 8/2011 |
| WO | 2012/030890 A2 | 3/2012 |
| WO | 2013/013024 A2 | 1/2013 |

OTHER PUBLICATIONS

International Search Report and Written Opinion for International Application No. PCT/US2014/070348 dated Mar. 10, 2015.

* cited by examiner

Primary Examiner — Michael Bernshteyn
(74) Attorney, Agent, or Firm — Simon L. Xu

(57) ABSTRACT

The present disclosure provides an ink for inkjet printing. The ink contains an aqueous vehicle, a dispersed pigment colorant, a dispersed polyurethane polymer, and a dispersed olefin ionic copolymer. The ink exhibits improved short-term durability.

15 Claims, No Drawings

PIGMENTED INKJET INK COMPRISING DISPERSED POLYURETHANE AND OLEFIN IONIC COPOLYMER

CROSS REFERENCE TO RELATED APPLICATIONS

This application claims priority under 35 U.S.C. § 119 from U.S. Provisional Application No. 61/921,714, filed Dec. 30, 2013.

BACKGROUND OF THE DISCLOSURE

This disclosure pertains to an aqueous inkjet ink, in particular to an aqueous inkjet ink comprising an aqueous vehicle, a dispersed pigment colorant, a dispersed polyurethane polymer, and a dispersed olefin ionic copolymer.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CNN). An ink set also commonly comprises a black ink (CMYK).

During inkjet printing, it is often necessary for the recently printed-article to come into contact with the paper-handling mechanism of the printer, e.g., in the case of duplex printing where both sides of the media are printed. In this case the first printed side may not yet be completely dry and as a result the print surface can be damaged and the ink can transfer onto the paper-handling mechanism and then onto subsequent prints. This problem is particularly acute when using a wet-press which involves considerable paper-handling at high speeds. Often the press uses heated rollers to transfer media which is prone to having problems as the drying ink sticks to the rollers. Severe problems may be encountered when slow-drying inks are printed onto non-absorbent media such as coated offset media.

U.S. Patent Application Publication No. 20080269374 discloses the formation of a passivation layer on pigment surface to prevent pigment-latex separation when applied to a substrate so as to improve durability. JP11001563, JP08239605 and JP08231909 disclose ink compositions containing ethylene/acrylic acid copolymer.

A need still exists for inkjet ink formulations that provide good short-term print durability. The present disclosure satisfies this need by providing ink compositions containing dispersed polyurethane and dispersed olefin ionic copolymer having improved durability.

SUMMARY OF THE DISCLOSURE

An embodiment provides an ink comprising an aqueous vehicle, a dispersed pigment colorant, a dispersed polyurethane polymer, and a dispersed olefin ionic copolymer.

Another embodiment provides that the dispersed polyurethane polymer has an acid number of 5 to 50 mg KOH/g polymer solids.

Another embodiment provides that the dispersed polyurethane polymer has an acid number of 15 to 35 mg KOH/g polymer solids.

Another embodiment provides that the dispersed olefin ionic copolymer has an acid number of 75 to 230 mg KOH/g polymer solids.

Another embodiment provides that the dispersed olefin ionic copolymer has an acid number of 110 to 200 mg KOH/g polymer solids.

Another embodiment provides that the weight ratio of said dispersed polyurethane polymer and said dispersed olefin ionic copolymer is from 0.2:1.0 to 10:0.2.

Another embodiment provides that the the weight ratio of said dispersed polyurethane polymer and said dispersed olefin ionic copolymer is from 0.5:1.0 to 1.0:0.5.

Another embodiment provides that the dispersed polyurethane polymer is neutralized by an alkaline metal salt.

Another embodiment provides that the alkaline metal is sodium or potassium.

Another embodiment provides that the ink further comprising an aprotic non-polar solvent.

Another embodiment provides that the aprotic non-polar solvent is selected from the group consisting of dibenzyl sebacate, diisobutyl Adipate, diethylene glycol dibutyl Ether, methyl isobutyl ketone tetraethylene glycol dimethyl ether propylene glycol, methyl amyl ketone, diacetate, propylene glycol methyl ether acetate, dipropylene glycol methyl ether acetate, ethylene glycol n-butyl ether acetate, diethylene glycol n-butyl ether acetate, dipropylene glycol dimethyl ether, and mixtures thereof.

Another embodiment provides that the aprotic non-polar solvent is dipropylene glycol dimethyl ether.

Another embodiment provides that the dispersed olefin ionic copolymer is selected from the group consisting of ethylene/acrylic acid, ethylene/methacrylic acid, propylene/acrylic acid, propylenelmethacrylic acid, copolymers, respective terpolymers and mixture thereof.

Another embodiment provides that the dispersed olefin ionic copolymer is an ethylene/acrylic acid copolymer.

Yet another embodiment provides that the ink is printed on offset media.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "OD" means optical density.

As used herein, the term "degree of functionalization" refers to the amount of hydrophilic groups present on the surface of the SDP per unit surface area, measured in accordance with the method described further herein.

As used herein, the term "aqueous vehicle" refers to water or a mixture of water and at least one water-soluble, or partially water-soluble (i.e., methyl ethyl ketone), organic solvent (co-solvent).

As used herein, the term "substantially" means being of considerable degree, almost all.

As used herein, the the "dyne/cm" means dyne per centimeter, a surface tension unit.

As used herein, the term "cP" means centipoise, a viscosity unit.

As used herein, the term "mPa·s" means millipascal second, a viscosity unit.

As used herein, the term "mN·m$^{-1}$" means milliNewtons per meter, a surface tension unit.

As used herein, the term "mS·cm$^{-1}$" means milliSiemens per centimeter, a conductivity unit.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "DHEG" means dihydroxyethylglycine.

As used herein, the term "DTPA" means diethylenetriamine-N,N,N',N'',N''-pentaacetic acid.

As used herein, the term "GEDTA" means glycoletherdiamine-N,N,N',N'-tetraacetic acid.

As used herein, Surfynol® 465 is a surfactant from Air Products (Allentown, Pa., U.S.A.).

As used herein, the term "RMSD" refers to root mean square deviation.

As used herein, the term "jettability" means good jetting properties with no clogging or deflection during printing.

As used herein, the term "persistence length" is a basic mechanical property quantifying, the stiffness of a long polymer.

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

Aqueous Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present disclosure are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present disclosure may contain about 60% to about 95% water, based on the total weight of the aqueous vehicle.

The amount of aqueous vehicle in the ink is typically in the range of about 70% to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynols® series from Air Products), ethoxylated primary (e.g., Neodol® series from Shell) and secondary (e.g., Tergitol® series from Union Carbide) alcohols, sulfosuccinates (e.g., Aerosol® series from Cytec), organosilicones (e.g., Silwet® series from Witco) and fluoro surfactants (e.g., Zonyl® series from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink. Surfactants may be used, typically in an amount of from about 0.01% to about 5%, and specifically from about 0.2% to about 2%, based on the total weight of the ink.

Pigments

The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment.

The selected pigment(s) may be used in dry or wet form. For example, pigments are usually manufactured in aqueous media, and the resulting pigments are obtained as a water-wet presscake. In presscake form, the pigment does not agglomerate to the extent it would in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and $ZnO$; and black pigment carbon black. The pigment names and abbreviations used herein are the "CI." designation for pigments established by Society of Dyers and Colourists. Bradford, Yorkshire, UK and published in *The Color Index*, Third Edition, 1971.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlomus acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions, Methods of making SDPs are well known and can be found, for example, in U.S. Pat. No. 5,554,739 and U.S. Pat. No. 6,852,156.

The SDPs may be black, such as those based on carbon black, or may be colored pigments. Examples of pigments with coloristic properties useful in inkjet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I.".

The SDPs of the present disclosure may have a degree of functionalization wherein the density of anionic groups is less than about 3.5 µmoles per square meter of pigment surface (3.5 µmol/m$^2$), and more specifically; less than about 3.0 µmol/m$^2$. Degrees of functionalization of less than about 1.8 µmol/m$^2$, and more specifically, less than about 1.5 µmol/m$^2$, are also suitable and may be preferred for certain specific types of SDPs.

The range of useful particle size after dispersion is typically from about 0.005 micrometers to about 15 micrometers. Typically, the pigment particle size should range from about 0.005 micrometers to about 5 micrometers; and, specifically, from about 0.005 micrometers to about 1 micrometers. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Polymeric Dispersant

The polymeric dispersant for the non-self-dispersing pigment(s) may be a random or a structured polymer. Typically, the polymer dispersant is a copolymer of hydrophobic and hydrophilic monomers. The "random polymer" means polymers where molecules of each monomer are randomly arranged in the polymer backbone. For a reference on suitable random polymeric dispersants, see: U.S. Pat. No. 4,597,794. The "random polymer" also includes polyurethanes. The "structured polymer" means polymers having a block, branched, graft or star structure. Examples of structured polymers include AB or BAB block copolymers such as the CMCS disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117.

Dispersed Polyurethane Polymer

The dispersed polyurethane polymers of the present disclosure include, but not limited to, the polyurethane dispersoid disclosed in U.S. Patent Application Publication No. 2005/0182154.

Dispersed Olefin Ionic Copolymer

The dispersed olefin ionic copolymers of the present disclosure include, but not limited to, copolymers of ethylene/acrylic acid, ethylene/methacrylic acid, propylene/acrylic acid, propylenelmethacrylic acid, and respective terpolymers and mixture thereof.

The dispersed polyurethane polymer and dispersed olefin ionic copolymer are included in the ink in an effective amount to improve short term print durability relative to the same ink without these additives. Typically, these additives are present in an ink at a level of at least about 0.2% by weight based on the total weight of the ink. The upper level is not limited, but is dictated by considerations such as compatibility with other ink components. In one embodiment, the additives are present in a range of 0.1% to 5% based on the total weight of the ink. In another embodiment, the bleed control agent is present in a range of 0.2% to 4% based on the total weight of the ink. The appropriate levels of bleed control agent can be readily determined by one of ordinary skill in the art through routine experimentation.

The weight ratio of the dispersed polyurethane polymer and the dispersed olefin ionic copolymer is typically from 0.2:1.0 to 1.0:0.2, and more typically from 0.5:1.0 to 1.0:0.5.

Other Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N",N"-pentaacetic acid (DTPA), and glycoletherdiamine-N,N,N,N-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendtimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A typical ink set comprises a magenta, yellow, cyan and black ink, wherein the black ink is an ink according to the present disclosure comprising an aqueous vehicle and a self-dispersing carbon black pigment. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The present embodiments are particularly advantageous for printing on plain paper, such as common electrophotographic copier paper and photo paper, glossy paper and similar papers used in inkjet printers.

Another particularly advantageous use of the inks and ink sets of the present disclosure is in the ink-jet printing of commercial coated offset media. Commercial offset paper typically contains a nonporous smooth surface. The smooth non-porous surface is formed by a coating which requires more time for fluids to penetrate. In many instances, offset coatings contain polymers that are more hydrophobic, e.g., styrene-butadiene based, than paper coatings specifically designed for ink-jet ink, e.g., water-soluble polymers such as polyvinyl alcohol. Thus, because offset coatings are typically hydrophobic, have poor penetration properties, and are smooth/non-porous, offset coatings tend to interact poorly with water-based inks. Examples of polymers used to coat offset media include latex binders, polystyrenes, polyolefins (polypropylene, polyethylene, polybutadiene), polyesters (PET), polyacrylates, polymethacrylates, and/or poly(maleic anhydride).

EXAMPLES

Inks were prepared by stirring the indicated ingredients together and filtering the resulting mixture. The water used in the following Examples was deionized unless otherwise stated.

Test Methods

Heated-Roller-Bar Durability

In order to test the resistance of the inks to damage by paper-handling equipment during the printing process the following test is conducted. A 1 ml (check) drop of ink is placed on the media to be tested and then this is drawn-down using a #15 bar to produce an ink film approximately 40 microns thick. This film is allowed to dry in ambient air for 80 seconds and then is wiped against a stainless steel bar heated to 120° C. The drawn-down ink film is visually evaluated for damage and rated according to the following scale.

| Damage to drawn-down film | Rating |
| --- | --- |
| No damage | 5 |
| very slight damage | 4 |
| Slight damage | 3 |
| Significant damage | 2 |
| Very poor | 1 |

The heated-roller-bar is also evaluated for any ink transfer from the print to the bar and rated according to the following scale

| Ink transfer | Rating |
| --- | --- |
| None | 5 |
| Almost none | 4 |
| Very slight | 3 |
| Slight | 2 |
| Significant transfer | 1 |

Dry Time

The ink to be tested is drawn down on the selected media as described above and then the wet film is wiped with a piece of copy paper at 10 second intervals. The dry-time is the time at which the ink no longer smudges on the media.

Dispersed Polyurethane Polymer

To a dry, alkali- and acid-free flask, equipped with an addition funnel, a condenser, stirrer and a nitrogen gas line, was added 699.2 g Desmophene C 200, 280.0 g acetone and 0.06 g DBTL. The contents were heated to 40° C. and mixed well. 189.14 g IPaI was then added to the flask via the addition funnel at 40° C. over 60 min, with any residual IPDI being rinsed from the addition funnel into the flask with 15.5 g acetone.

The flask temperature was raised to 50° C. and held for 30 minutes. 44.57 g DMPA followed by 25.2 g TEA was then added to the flask via the addition funnel, which was then rinsed with 15.5 g acetone. The flask temperature was then raised again to 50° C. until NCO % was 1.14% or less.

With the temperature at 50° C., 1498.0 g deionized (DI) water was added over 10 minutes, followed by mixture of 97.5 g EDA (as a 6.25% solution in water) and 29.7 g TETA (as a 6.25% solution in water) over 5 minutes, via the addition funnel, which was then rinsed with 80.0 g water. The mixture was held at 50° C. for 1 hr, then cooled to room temperature.

Acetone (~310.0 g) was removed under vacuum, leaving a final dispersoid of polyurethane with about 35.0% solids by weight.

Ethylene/methacrylic Acid Copolymer

The ethylene/methacrylic acid copolymer (DuPont material designated SEP 1702-1) contained 19% by weight of methacrylic acid with an acid number of 124 mg KOH/g and melt index of 300. An aqueous dispersion was formed by neutralizing with sodium hydroxide in water and stirring. The dispersion particle size was 87 nm.

Ethylene/Acrylic Acid Copolymer

The ethylene/acrylic acid copolymer dispersion was Michem Prime 5931 (Michelman Inc., Cincinnati, Ohio). This contains 20% by weight acrylic acid and has an acid number of 160 mg KOH/g. This is an ammonia neutralized aqueous dispersion with an average particle size of 60 nm.

Polyurethane Dispersant 1 (BMEA Terminated IPDI/Terathane650)

To a dry, alkali- and acid-free flask equipped with an addition funnel, a condenser and a stirrer, under a nitrogen atmosphere was added Terathane® 650 (300 g), DMPA (180 g), Sulfolane (877 g) and DBTL (0.12 g). The resulting mixture was heated to 60° C. and thoroughly mixed. To this mixture was added IDPI (437 g) via the addition funnel mounted on the flask followed by rinsing any residual IDPI in the addition funnel into the flask with Sulfolane (5 g). The temperature for the reaction mixture was raised to 85° C. and maintained at 85° C. until the isocyanate content reached 1.2% or below. The temperature was then cooled to 60° C. and maintained at 60° C. while BMEA (46 g) was added via the addition funnel over a period of 5 minutes followed by rinsing the residual BMEA in the addition funnel into the flask with Sulfolane (5 g). After holding the temperature for 1 hr at 60° C. aqueous KOH (117 g 45% by weight aqueous solution) was added over a period of 10 minutes via the addition funnel followed by de-ionized water (1250 g). The mixture was maintained at 60° C. for 1 hr and cooled to room temperature to provide a polyurethane dispersant with 30% of solids.

Preparation of Crosslinked Magenta Pigment Dispersion 1 and Black Pigment Dispersion 1

Crosslinked pigment dispersions were prepared with magenta (Pigment Red 122) and carbon black pigments.

The following procedure was used to prepare pigmented dispersions with polyurethane dispersant 1. Using a Buhler PML mill, a premix was prepared at typically 20-30% pigment loading and the targeted dispersant level was selected at a pigment/dispersant (P/D) ratio of 1.5-3.0, A P/D of 2.5 corresponds to a 40% dispersant level on pigment. Optionally, a co-solvent was added at 10% of the total dispersion formulation to facilitate pigment wetting and dissolution of dispersant in the premix stage and ease of grinding during milling stage. Although other similar cosolvents are suitable, triethylene glycol monobutyl ether (TEB as supplied from Dow Chemicals) was the co-solvent of choice. The polyurethane dispersants of the present invention were neutralized prior to pigment dispersion preparation with either KOH or amine to facilitate dissolution of polymer into water and wetting of the pigment. During the premix stage, the pigment level was maintained at typically 27%, and was subsequently reduced to about 24% during the milling stage by the addition of de-ionized water for optimal media mill grinding conditions. After completion of the milling stage, which was typically 4 hours, the remaining letdown of de-ionized water was added and thoroughly mixed.

All the pigmented dispersions processed with co-solvent were purified using an ultrafiltration process to remove co-solvent(s) and filter out other impurities that may be present. After completion, the pigment levels in the dispersions were reduced to about 10 to 15%.

In the cross-linking step, a cross-linking compound, Denacol 321, was mixed with the pigmented dispersions and heated between 60° C. and 80° C. with efficient stirring for between 6 to 8 hours. The Denacol 321 was added at 3% by weight of the pigment. After the cross-linking reaction was completed, the pH was adjusted to at least about 8.0 if needed.

Self-Dispersed Black Pigment Dispersion

Carbon black (S-160 from Degussa, surface area 150 $m^2/g$) was oxidized with ozone according to the process described in WO01/94476 and neutralized with LiOH, After recovery, a 16.6 weight percent dispersion of self-dispersing carbon black pigment in water was obtained with a viscosity of 3.5 cps (25° C.). The median particle size was 110 nm and the acid number (degree of functionalization) was 3.3 μmol/$m^2$. The degree of functionalization, as measured, was slightly above the target level of <3.0 μmol/$m^2$.

The degree of functionalization (acid value) of this SDP (and others in these examples made by the process according to WO01/94476) was determined by the equivalent moles of base required to neutralize the treated pigment to a pH of 7. As the surface hydrophilic groups are substantially all acidic, the acid value also equals the degree of functionalization.

Equivalent moles of base can be determined by titration or, in the case of inorganic bases such as alkali metal hydroxides, by atomic absorption (AA) or Inductive Coupled Plasma (ICP) analysis. Moles of base per gram of SDP is obtained and converted to μmol/$m^2$ by dividing by the surface area of the pigment and adjusting the units appropriately. For accuracy, the neutralized sample must be free of contaminants, such as free acids or salts, which would interfere with the measurement.

EXAMPLE 1

The following inks were prepared and then tested on two offset coated media. The results are summarized in the table below.

| | Ink 1 | Ink2 | Ink 3 | Comparative Ink 1 | Comparative Ink 2 | Comparative Ink 3 |
|---|---|---|---|---|---|---|
| Composition | | | | | | |
| Magenta Dispersion 1 | 5.0% | 5.0% | 5.0% | 5.0% | 5.0% | 5.0% |
| Ethylene glycol | 16.0% | 5.0% | 10.5% | 16.0% | 10.0% | 10.0% |
| Proglyde | 0.0% | 5.0% | 2.5% | 0.0% | 0.0% | 0.0% |
| 2P | 6.0% | 12.0% | 9.0% | 6.0% | 12.0% | 12.0% |
| Proxel GXL | 0.2% | 0.2% | 0.2% | 0.2% | 0.2% | 0.2% |
| Water, Balanced to 100% (Bal.) | Bal. | Bal. | Bal. | Bal. | Bal. | Bal. |
| Binder: | | | | | | |
| Polyurethane Dispersion | 4.0% | 4.0% | 2.0% | 0.0% | 4.0% | 0.0% |
| Ethylene/Acrylic acid copolymer | 4.0% | 4.0% | 2.0% | 0.0% | 0.0% | 4.0% |
| Test | | | | | | |
| Drawdown durability | 5 | 4 | 4 | 1 | 3 | 3 |
| Ink transfer | 3 | 4 | 3 | 3 | 3 | 3 |
| Dry-time | 20 sec | 10 sec | 30 sec | 20 sec | 20 sec | 30 sec |

Results on UPM Finesse Gloss Media.

The inventive inks with the combination of binders have significantly better draw-down durability than the comparative inks with just one binder or the other. The ink transfer and dry times are comparable or slightly better than the comparative inks.

| Test | Ink 1 | Ink2 | Ink 3 | Comparative Ink 1 | Comparative Ink 2 | Comparative Ink 3 |
|---|---|---|---|---|---|---|
| Drawdown durability | 2 | 4 | 3 | 1 | 2 | 2 |
| Ink transfer | 1 | 1 | 1 | 1 | 1 | 1 |
| Dry-time | 60 sec | 30 sec | 80 sec | 60 sec | 80 sec | 60 sec |

Results on OK Topcoat Media

The inventive inks with the combination of binders have significantly better draw-down durability than the comparative inks with just one binder or the other. The dry times are comparable or slightly better than the comparative inks. On this media there was no improvement in ink transfer to the heated roller bar.

EXAMPLE 2

The following inks were made using self-dispersed black pigment dispersion 1 and tested in a similar way

| Composition | Ink 1 | Ink 2 | Comparative Ink 1 | Comparative Ink 2 | Comparative Ink 3 |
|---|---|---|---|---|---|
| Self-dispersed Black Pigment Dispersion 1 | 5.0% | 5.0% | 5.0% | 5.0% | 5.0% |
| Ethylene glycol | 10.0% | 10.0% | 10.0% | 10.0% | 10.0% |
| Proglyde | — | 3.0 | — | — | — |
| 2P | 10.0% | 10.0% | 10.0% | 10.0% | 10.0% |
| Proxel GML | 0.2% | 0.2% | 0.2% | 0.2% | 0.2% |
| Water, Balance to 100% (Bal.) | Bal. | Bal. | Bal. | Bal. | Bal. |
| Binder: | | | | | |
| Polyurethane Dispersion | 2.0% | 2.0% | — | 4.0% | — |
| Ethylene/Methacrylic acid copolymer | 2.0% | 2.0% | — | — | 4.0% |

Test Results on OK Topcoat Paper

| Test | Ink 1 | Ink 2 | Comparative Ink 1 | Comparative Ink 2 | Comparative Ink 3 |
|---|---|---|---|---|---|
| Drawdown durability | 4 | 4 | 5 | 2 | 2 |
| Ink transfer | 4 | 3 | 4 | 1 | 3 |
| Dry-time/Smudge | 40 sec | 40 sec | >100 sec | 40 sec | 340 sec |

The inventive inks showed the best balance of durability, little ink transfer and faster drying.

EXAMPLE 3

The following inks were made using a black pigment dispersion and tested in a similar way

| Composition | Ink 1 | Ink 2 | Comparative Ink 1 | Comparative Ink 2 | Comparative Ink 3 |
|---|---|---|---|---|---|
| Black2 Dispersion | 5.0% | 5.0% | 5.0% | 5.0% | 5.0% |
| Ethylene glycol | 10.0% | 10.0% | 10.0% | 10.0% | 10.0% |
| Proglyde | 2.5% | 2.5% | 2.5% | 2.5% | 2.5% |
| 2P | 10.0% | 10.0% | 10.0% | 10.0% | 10.0% |
| Proxel GXL | 0.2% | 0.2% | 0.2% | 0.2% | 0.2% |
| Water, Balance to 100% (Bal.) | Bal. | Bal. | Bal. | Bal. | Bal. |
| Binder: | | | | | |
| Polyurethane Dispersion | 2.0% | 3.0% | 0.0% | 6.0% | 0.0% |
| Ethylene/Methacrylic acid copolymer | 2.0% | 3.0% | 0.0% | 0.0% | 6.0% |

Test Results on UPM Finesse Gloss Paper

| Test | Ink 1 | Ink 2 | Comparative Ink 1 | Comparative Ink 2 | Comparative Ink 3 |
|---|---|---|---|---|---|
| Drawdown durability | 5 | 4 | 4 | 3 | 3 |
| Ink transfer | 5 | 4 | 3 | 3 | 3 |
| Dry-time | 20 sec | 10 sec | 30 sec | 30 sec | 30 sec |

The inventive inks show better durability, less ink transfer and faster drying than the comparative inks

What is claimed is:

1. An inkjet ink comprising an aqueous vehicle, a dispersed pigment colorant, a dispersed polyurethane polymer, and a dispersed olefin ionic copolymer, wherein said dispersed pigment is a self-dispersing pigment.

2. The ink of claim 1, wherein said dispersed polyurethane polymer has an acid number of 5 to 50 mg KOH/g polymer solids.

3. The ink of claim 1, wherein said dispersed polyurethane polymer has an acid number of 15 to 35 mg KOH/g polymer solids.

4. The ink of claim 2, wherein said dispersed olefin ionic copolymer has an acid number of 75 to 230 mg KOH/g polymer solids.

5. The ink of claim 4, wherein said dispersed olefin ionic copolymer has an acid number of 110 to 200 mg KOH/g polymer solids.

6. The ink of claim 5, wherein the weight ratio of said dispersed polyurethane polymer and said dispersed olefin ionic copolymer is from 0.2:1.0 to 1.0:0.2.

7. The ink of claim 6, wherein the weight ratio of said dispersed polyurethane polymer and said dispersed olefin ionic copolymer is from 0.5:1.0 to 1.0:0.5.

8. The ink of claim 2 further comprising an aprotic non-polar solvent.

9. The ink of claim 8, wherein said aprotic non-polar solvent is selected from the group consisting of dibenzyl sebacate, diisobutyl adipate, diethylene glycol dibutyl ether, methyl isobutyl ketone, tetraethylene glycol dimethyl ether, propylene glycol diacetate, methyl amyl ketone, propylene glycol methyl ether acetate, dipropylene glycol methyl ether acetate, ethylene glycol n-butyl ether acetate, diethylene glycol n-butyl ether acetate, dipropylene glycol dimethyl ether, and mixtures thereof.

10. The ink of claim 9, wherein said aprotic non-polar solvent is dipropylene glycol dimethyl ether.

11. The ink of claim 2, wherein dispersed olefin ionic copolymer is selected from the group consisting of ethylene/acrylic acid, ethylene/methacrylic acid, propylene/acrylic acid, propylene/methacrylic acid, copolymers, terpolymers and mixture thereof.

12. The ink of claim 11, wherein said dispersed olefin ionic copolymer is an ethylene/acrylic acid copolymer.

13. The ink of claim 2, wherein said ink is printed on offset media.

14. The ink of claim 13, wherein the weight ratio of said dispersed polyurethane polymer and said dispersed olefin ionic copolymer is from 0.2:1.0 to 1.0:0.2.

15. The ink of claim 14 further comprising an aprotic non-polar solvent.

* * * * *